(12) United States Patent
Minowa et al.

(10) Patent No.: US 8,497,612 B2
(45) Date of Patent: Jul. 30, 2013

(54) PERMANENT MAGNET ROTATING MACHINE

(75) Inventors: Takehisa Minowa, Tokyo (JP); Yuhito Doi, Tokyo (JP); Koji Miyata, Tokyo (JP); Minori Miyata, legal representative, Fukui (JP); Atsushi Miyata, legal representative, Fukui (JP); Hideki Kobayashi, Tokyo (JP)

(73) Assignee: Shin-Etsu Chemical Co., Ltd. (JP)

( * ) Notice: Subject to any disclaimer, the term of this patent is extended or adjusted under 35 U.S.C. 154(b) by 239 days.

(21) Appl. No.: 12/676,058

(22) PCT Filed: Sep. 10, 2008

(86) PCT No.: PCT/JP2008/066309
§ 371 (c)(1),
(2), (4) Date: Jun. 16, 2010

(87) PCT Pub. No.: WO2009/034990
PCT Pub. Date: Mar. 19, 2009

(65) Prior Publication Data
US 2010/0253085 A1 Oct. 7, 2010

(30) Foreign Application Priority Data
Sep. 14, 2007 (JP) .................................. 2007-238978

(51) Int. Cl.
*H02K 21/10* (2006.01)
(52) U.S. Cl.
USPC ............................. 310/113; 290/44; 290/55
(58) Field of Classification Search
USPC ............... 310/156.32, 156.36, 112–114, 266, 310/268; 290/43, 44, 54, 55
See application file for complete search history.

(56) References Cited

U.S. PATENT DOCUMENTS 4,211,945 A * 7/1980 Tawse ........................... 310/112
5,001,412 A * 3/1991 Carter et al. .................... 322/10
(Continued)

FOREIGN PATENT DOCUMENTS

CN 1988333 A 6/2007
EP 0026584 A1 4/1981
(Continued)

OTHER PUBLICATIONS

International Search Report corresponding to International Application No. PCT/JP2008/066309 mailed Oct. 7, 2008.
(Continued)

*Primary Examiner* — Dang Le
(74) *Attorney, Agent, or Firm* — Myers Bigel Sibley & Sajovec, P.A.

(57) ABSTRACT

A permanent magnet rotating machine includes a rotating shaft and two end rotors. The rotating shift includes at least one inner rotor capable of rotating integrally with the rotating shaft, and being arranged in the space formed by the two end rotors so as to be separate from the two end rotors, and at least two stators isolated from the rotation of the rotating shaft, and being arranged in the spaces formed by the end rotors and the inner rotor. The end and inner rotor permanent magnets are arranged at equal intervals at the end and inner rotating disks; and the three or more stator coils are arranged circumferentially at equal intervals in the concentric circles of each of the fixed disks so as to face the two or more concentric circles of the end and inner permanent magnets on which the permanent magnets are arranged on the rotating disks.

9 Claims, 15 Drawing Sheets

U.S. PATENT DOCUMENTS

| | | | |
|---|---|---|---|
| 5,021,698 A | 6/1991 | Pullen et al. | |
| 6,147,415 A * | 11/2000 | Fukada | 290/55 |
| 6,930,422 B2 * | 8/2005 | Rose | 310/156.32 |
| 2006/0022552 A1 * | 2/2006 | Zhu et al. | 310/268 |

FOREIGN PATENT DOCUMENTS

| | | |
|---|---|---|
| EP | 1340910 A1 | 9/2003 |
| JP | 62-272852 | 11/1987 |
| JP | 02-074142 | 3/1990 |
| JP | 07-227073 A | 8/1995 |
| JP | 2001-327131 A | 11/2001 |
| JP | 2002153036 | 5/2002 |
| JP | 2002-320364 | 10/2002 |
| JP | 2003-348805 | 12/2003 |
| JP | 2004-140937 | 5/2004 |
| JP | 2004140937 | 5/2004 |
| JP | 2004-312911 | 11/2004 |
| JP | 2005-218263 | 8/2005 |
| JP | 2006-246561 A | 9/2006 |
| JP | 2007-135315 | 5/2007 |
| JP | 2007-202363 | 8/2007 |
| WO | WO 2004/017497 A1 | 2/2004 |

OTHER PUBLICATIONS

Supplementary European Search Report corresponding to European Patent Application No. 08830285.6 dated Jan. 7, 2011.
First Notification of Office Action corresponding to Chinese Patent Application No. 200880106738.9 dated Nov. 24, 2011.
Office Action dated Apr. 27, 2012 corresponding to Japanese Patent Application No. 2007-238978; 2 pages.

* cited by examiner

PERMANENT MAGNET ROTATING MACHINE

RELATED APPLICATIONS

This application is a 35 U.S.C. §371 national stage application of PCT Application No. PCT/JP2008/066309, filed on Sep. 10, 2008, which claims priority from Japanese Application No. 2007-238978 filed Sep. 14, 2007, the contents of which are incorporated herein by reference in their entireties. The above-referenced PCT International Application was published in the English language as International Publication No. WO 2009/034990 A1 on Mar. 19, 2009.

TECHNICAL FIELD

The present invention relates to a permanent magnet rotating machine applicable to a motor or a generator. More particularly, it relates to an axial-gap permanent magnet rotating machine in which a rotor and a stator face each other in the direction along the rotation axis.

BACKGROUND ART

Rotating machines applicable to motors or generators have some variations. In particular, the rotating machines applicable to generators may include a type using coil or a prototype using permanent magnet in order to generate magnetic field.

Although these two types have both merits and demerits, if putting weight on power generation efficiency, the permanent magnet rotating machine using permanent magnets to generate a magnetic field is used. The reason for this is that, in the case where two types of generators are compared with each other by size, the generator using the rotating machine using permanent magnets to generate a magnetic field can generate a stronger magnetic field than the generator using the rotating machine using coils, and the amount of magnetic flux interlinked with an armature coil increases, so that an induced voltage can be made high.

Also, the permanent magnet rotating machine is structurally categorized into a radial gap type and an axial gap type. In the radial gap type, a plurality of magnets having the radial magnetization direction are arranged in the circumferential direction of a cylindrical rotor, and coils are arranged on a cylindrical stator provided on the outer periphery side or the inner periphery side of the rotor so as to face the permanent magnets. Generally in the radial gap type, the individual stator coils are wound around an iron core having a plurality of teeth, so that magnetic fluxes from the rotor poles can efficiently link with the coils. However, this iron core produces cogging torque due to a magnetic attraction force between the magnetic pole and the iron core, which poses a problem of increased starting torque, for example, when the rotating machine is used as a generator. Also, in the general radial gap type, since the magnetic poles are arranged only in the outer peripheral part of a cylinder, there also arises a problem in that a space inside the cylinder is not utilized effectively.

On the other hand, the axial gap type has a construction such that, as shown in FIG. 13, disk-shaped rotors 103 are attached to a rotating shaft 102, and a stator 105 is provided in the direction along the rotation axis so as to face to the rotors 103. Each of the rotors 103 is provided with a plurality of permanent magnets 104, and a plurality of coils 106 are attached on the stator 105 so as to face to the permanent magnets 104. As shown in FIG. 14, the configuration sandwiching the stator between the two rotors improves the magnetic efficiency, and affords the sufficient output without the insertion of an iron core into the call. The type in which no iron core is provided in the coil, which is hereinafter referred to as a core less type, does not generate a magnetic attraction force caused by the magnetic field generated by the permanent magnets due to lack of an iron core. Therefore, this type can start the rotation of the generator with relatively small starting torque, and is advantageous for the use of a wind power generation. JP2002-320364A discloses one example of the axial gap type generator.

The axial-gap permanent magnet rotating machine shown in FIGS. 13 and 14 has eight magnetic poles and six coils. This shape can be used as a relatively small-size generator.

When the scale-up is intended, the outside diameter may be increased, or the number of stages in the direction along the rotation axis may be increased.

In the case where the outside diameter is simply increased, the magnet size may become large. A generally used permanent magnet is so-called a ferrite magnet or a rare-earth magnet. Because of its high magnetic properties, a rare-earth sintered magnet has been used in many cases. The rare-earth sintered magnet is manufactured by using a process in which the metal powder of rare-earth magnet is press molded and sintered. Therefore, a magnet larger than the critical size becomes difficult to manufacture. Further, the magnet is made generate a magnetic force through a magnetizing process in which a strong magnetic field is applied. As for the magnetization as well, it is difficult to magnetize a too large magnet at one time due to the restriction of an electromagnet for generating an external magnetic field. In the case where the fan-shaped magnet 104 as shown in FIG. 13 is made larger in size, as shown in FIGS. 15 and 16, the magnet pieces 104a and 104b are manufactured by dividing the magnet 104 into magnetizable magnet sizes, and are assembled on the rotor 103 with the like poles being adhered closely to each other. However, it is difficult to assemble the magnetized magnets because the like poles have a repulsive magnetic force.

In application for a wind power generation, the rotating machine is placed outdoors, and subject to a large temperature difference between summer and winter seasons. In the case where the permanent magnets and the rotor are jointed by bonding, a stress occurs on the bonding surface and the bonding is destroyed due to a difference in thermal expansion between the permanent magnets and the rotor because an Nd magnet has a thermal expansion coefficient in the non-magnetization direction of $-1.7 \times 10^{-6}$ [1/K] whereas the soft iron used for the rotor has a thermal expansion coefficient of $10 \times 10^{-6}$ [1/K]. Since the stress at the edge of the magnet increases as the bonding area becomes large, the size of magnet to be fixed by bonding depends on the operation environment and the material used.

Accordingly, it is difficult to manufacture large magnets and attach them to the rotor disk in consideration of the scale-up of the axial gap type rotating machine.

Patent Document 1: JP2002-320364A

SUMMARY OF THE INVENTION

Problem to be Solved by the Invention

Accordingly, an object of the present invention is to provide a permanent magnet rotating machine applicable to a power generating facility such as a wind power generating facility, which facilitates the increase of the capacity of an axial gap rotating machine, and affords the high space efficiency.

Means for Solving the Problem

The present invention can provide a permanent magnet generator comprising: a rotating shaft; at least three rotors connected to the rotating shaft, in which disk-shaped structures mounted with permanent magnets are arranged in the axial direction of the rotating shaft; and stators isolated from the rotating shaft, having disk-shaped structures comprising stator coils formed by winding copper wires, arranged at each gap formed between the three rotors. In this permanent magnet generator, the permanent magnets attached to the rotors have the magnetization direction along the rotation axis; the permanent magnets are arranged on each of two or more concentric circles having different diameters so that the N pole and the S pole appear alternately at even intervals by four or more magnetic poles in the circumferential direction; three or more stator coils are arranged at even intervals in each of two or more concentric circles having different diameters; and a total of five or more rotors and stators are arranged alternately in the direction along the rotating shaft.

In another preferable mode of the present invention, the stator coils on the same circle are connected in series in the single phase state, or connected in the triphasic state.

According to the present invention, a wind power generator comprising a propeller on the rotating shaft of this permanent magnet rotating machine can further be provided.

An object of the present invention is to provide a permanent magnet rotating machine in which the permanent magnets can be assembled easily and the scale of the rotating machine can be enlarged more easily than in the conventional rotating machine in an axial-gap permanent magnet rotating machine.

The increase in magnet size for increasing the capacity of generator presents problems in some respects. In wind power generation, the generator is placed out of doors, and subject to a large temperature difference between summer and winter seasons. In the case where the permanent magnet and the rotor are joined by bonding, a stress occurs on the bonding surface and the bonding is destroyed due to a difference in thermal expansion between the magnet and the rotor. The stress at the edge increases as the bonding area becomes large. Therefore, the size of magnet capable of being fixed by bonding is naturally restricted by the service environment and the material used. Also, in the aspect of magnetization as well, because of the restriction of a magnetizer, it is difficult to magnetize a material having a too large area at one time. In the present invention, by increasing the number of circuits, the scale of generator can be enlarged by using the magnets each having a size suitable for manufacturing.

In the present invention, in the case where the capacity of rotating machine is increased, there can be used a method in which along with the increase in rotor diameter and stator diameter, the sizes of the magnets and coils are not increased, but the number of circuits of magnetic poles and coils is increased with the external dimensions of the magnets and coils being approximately equal, so that parts such as the magnets and coils can be made common, and therefore the reduction in cost can be anticipated.

Also, the inventors have so far invented a method for increasing a generated voltage by configuring the rotors and the stators in multiple stages in the axial direction. This method can be applied to the present invention as well.

Further, in the present invention, the magnetic poles and the stator coils are arranged in concentric circles having different diameters, and these elements can be controlled individually. That is to say, in the case where the rotating machine is used as a generator, each circuit can be handled as a different generator.

Effect of the Invention

The present invention can achieve effects described below. As the wind velocity increases, the number of magnetic poles and stator coil groups used is increased, by which the quantity of power generation can be increased, and also the rotational speed can be restrained and controlled. Thus, with the change in wind velocity, the magnetic poles and stator coil groups used for power generation are controlled, by which the rotational speed can be controlled so as to follow an optimum operation curve in the relationship between the rotational speed of windmill and the output of generator, so that the optimum operation of wind power generator can be realized. At the time of strong wind, an electrical brake is applied to keep the rotational speed of windmill constant, by which the sound of windmill can be made quiet.

Also, in the wind power generation, to start the movement of windmill from the state in which the windmill stops, driving torque is sometimes given from the generator side. In this case, the rotating machine of the present invention can also be used as a motor for giving the driving torque.

Figure 1:
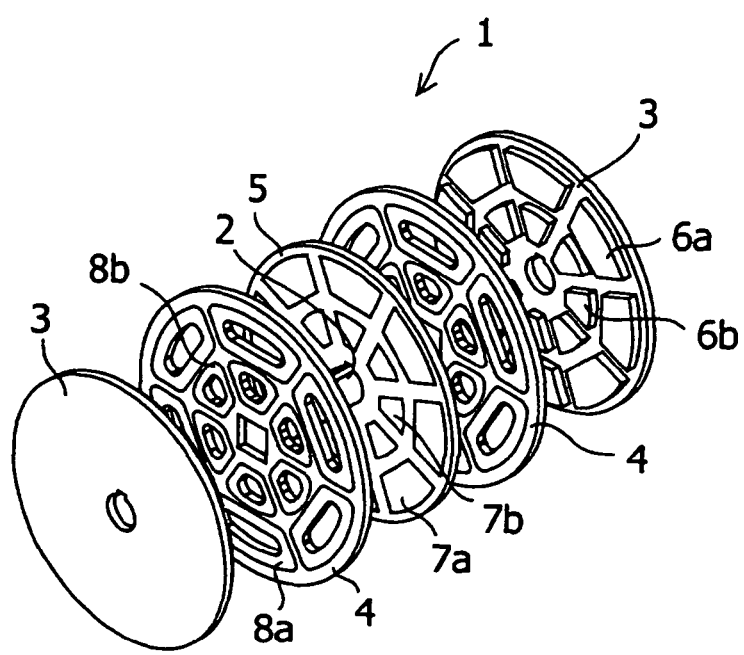
FIG. 1 is a perspective view showing one embodiment of a permanent magnet rotating machine of the present invention.

EXPLANATIONS OF LETTERS AND NUMERALS 1 rotating machine
2 rotating shaft
3, 5 rotor
4 stator
6a, 6b, 10a, 10b, 10c permanent magnet at end rotors
7a, 7b, 11a, 11b, 11c permanent magnet at inner rotors
8a coils in outer periphery
8b coils in inner periphery
20 wind power generator
101 conventional rotating machine
102 rotating axis
103 rotor
104 permanent magnet
104a, 104b magnet piece
105 stator
106 coil

BEST MODE FOR CARRYING OUT THE INVENTION

Figure 2:
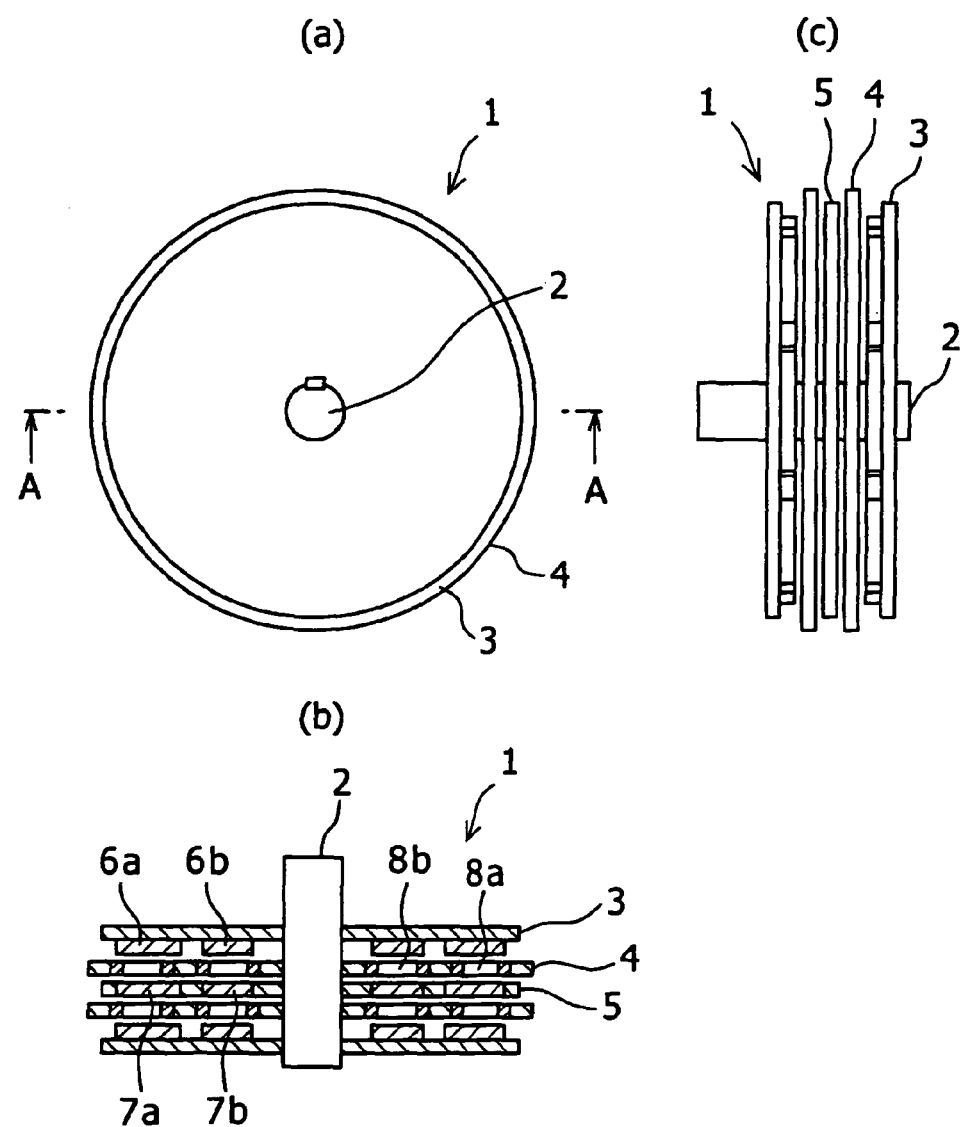
FIG. 2(A) is a front view of the rotating machine shown in FIG. 1, viewed in the direction along the rotation axis.
FIG. 2(B) is a side view thereof.
FIG. 2(C) is a sectional view thereof.

One embodiment of a permanent magnet rotating machine of the present invention is shown in FIGS. 1 and 2. FIG. 1 is a perspective view showing the whole of the permanent magnet rotating machine of the present invention. FIG. 2(A) is a front view of the rotating machine shown in FIG. 1, viewed in the direction along the rotation axis, FIG. 2(B) is a side view thereof, and FIG. 2(C) is a sectional view thereof. A rotating shaft 2 for transmitting a rotational force is rotatably supported by a generator case (not shown) via a bearing. One end of the rotating shaft 2 can be connected to a propeller or the like, so that the rotational force is transmitted to the rotating machine in the case where the rotating machine is used as a generator. Rotors 3 and 5 are connected to the rotating shaft 2, and rotate in synchronization with the rotating shaft 2. That is to say, this rotating machine has the rotating shaft 2, the rotors 3 and 5 each of which is configured so that a plurality of permanent magnets (6a, 6b, 7a, 7b) are arranged in the circumferential direction on a directly connected disk-shaped structure, and stators 4 each of which is configured so that a plurality of coils (8a, 8b) are arranged at positions facing to the rotation loci of the permanent magnets, and therefore is constructed so that the rotors 3 and the stators 4 are laminated alternately. In this example, three rotors are formed and the stators provided with the coils are held between the rotors.

Figure 3:
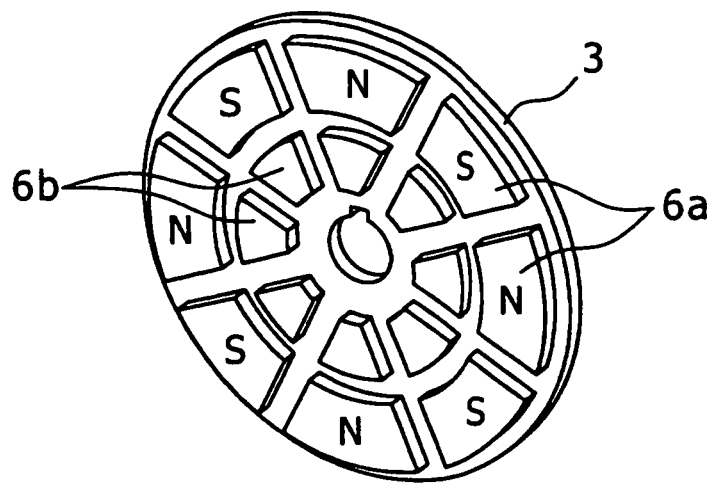
FIG. 3 is a perspective view showing an end rotor shape of the rotating machine shown in FIG. 1.
Figure 4:
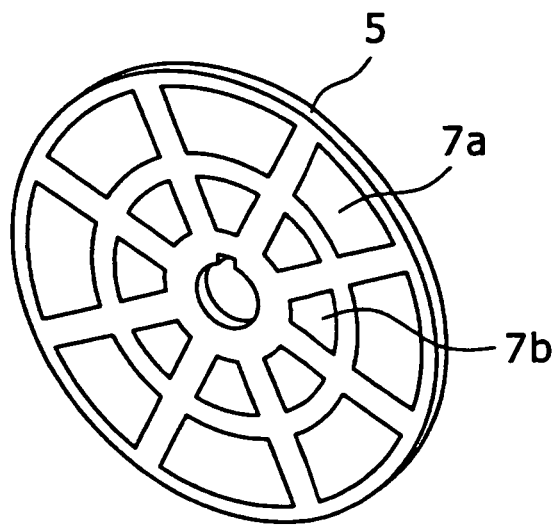
FIG. 4 is a perspective view showing an inner rotor shape of the rotating machine shown in FIG. 1.

For example, as shown in FIGS. 3 and 4, on one rotor, the plurality of permanent magnets are arranged at equal intervals in each of concentric circles having different diameters with the rotating shaft being the center, and the permanent magnets form a plurality of circuits. In this example, two circles are formed. The magnetization direction of the permanent magnet is directed toward the axial direction, and the permanent magnets are arranged so that the magnets adjacent to each other in the circumferential direction have reverse polarities. It is desirable that the permanent magnet have external dimensions such that the magnet can be magnetized as a single unit and that the stress in the end part of the bonding surface caused by a difference in thermal expansion coefficients within the service temperature range is not higher than the bonding strength. Specifically, the size of magnet is not subject to any special restriction. However, a shape such that the magnetic pole area is not larger than 90,000 mm$^2$ is desirable because of the restriction of size capable of being magnetized by the existing magnetizer. Also, the magnets are arranged at predetermined intervals on the rotor. This is because a distance of a degree such that the magnetic attraction repulsive force between the magnets does not pose a problem in terms of assembling at the time of assembling is secured. By this configuration, even when the size of rotating machine increases, a facility necessary for assembling need not be made large in size than needed.

The rotor diameter is not specially specified. However, preferably, the sum of circuits of magnet can be designed within a range such that the upper limit is about 12 m because of the restriction in manufacturing and transporting.

According to the present invention, the number of magnetic poles made by the permanent magnets arranged on each rotor can be increased if the rotor diameter is increased, and four or more magnetic poles are preferable.

In the examples shown in FIGS. 3 and 4, the rotor is formed so that the poles are formed in two concentric circles having different diameters, and the number of poles is eight on both the outer periphery side and the inner periphery side. The number of magnets attached to each of the rotors is equal, and the magnets at the same position on each of the rotors as viewed in the axial direction have the same polarity. The shape of magnet is not subject to any restriction, and the shape thereof may be, for example, fan-like, rectangular, or trapezoidal. FIG. 3 shows an end rotor, and FIG. 4 shows a rotor held between the stators (an inner rotor).

The number of poles may be different on each of the circuits. In the case where the rotating machine is used as a generator, generally, if the rotational speed is equal, when the number of poles is increased, the time change of the magnetic flux interlinking with the coil increases, and therefore the voltage rises. On the other hand, if the number of poles is increased too much and thereby the magnet size is decreased, the interlinking magnetic flux decreases, and therefore the voltage lowers. Thus, the rotational speed and the number of magnetic poles, that is, the size of magnet on each of the circuits have the optimum values. In the present invention, design can be made so that the optimum number of poles is provided on each of the circuits.

Two end rotors placed at both ends among several rotors are different from other rotors i.e. the inner rotors, in that they have two end rotating disks arranged with a space being provided therebetween in the axial direction of the rotating shaft and permanent magnets arranged on the facing surfaces of the two end rotating disks. For example, as shown in FIG. 3, a rotor in which the permanent magnets are fixed onto a yoke made of a ferromagnetic material with an adhesive (for example, epoxy resin or acrylic resin) can be used. Thereby, the magnetic field between the end rotor and the inner rotor facing thereto is strengthened, the magnetic flux generated from the magnetic pole is refluxed into the yoke, and therefore the externally leaking magnetic flux from the end rotor is decreased. As a result, the leaking magnetic flux reduces a torque loss caused by an eddy current generated by the generator case, and at the same time, the amount of magnetic flux in a gap between the rotors increases, by which the power generation performance can be enhanced. The material for the yoke is not subject to any special restriction as far as it is a magnetic material. As the material therefor, for example, iron or magnetic stainless steel can be used.

In the rotor other than the end rotor, the permanent magnets are supported by a magnet supporting member. This rotor can be used in which the magnets are fitted into a frame made of a nonmagnetic material (aluminum, stainless steel, resin, or the like), for example, as shown in FIG. 4. Thereby, the same magnetic fields can be generated in gaps on both sides of the rotor, and the magnetic field from the magnet is not weakened because the frame uses the nonmagnetic material.

Thus, a multipolar and very strong magnetic filed is formed in the gap between the rotors. Since a stronger magnetic field can be obtained as the gap between the rotors decreases, the gap is preferably made small as far as possible.

Figure 5:
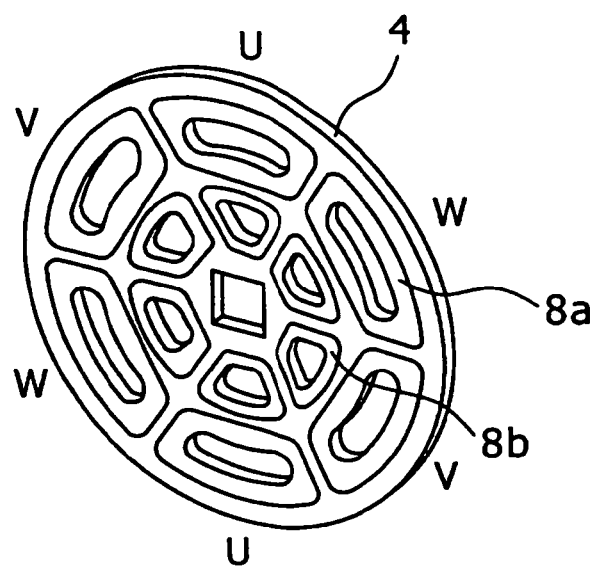
FIG. 5 is a perspective view showing a stator shape of the rotating machine shown in FIG. 1.

On one stator, the coils are arranged in concentric circles having different diameters so as to face to the magnetic poles of the rotor, for example, as shown in FIG. 5. The number of coils arranged in each circle is such that the ratio thereof to the number of magnetic poles 1:1 in single phase and 4:3, 2:3, 8:9, 10:9, 10:12 and 12:15 in triphase alternating current. The number of stator coils is preferably three or more in each circle. In the example shown in FIG. 5, the number of corresponding coils is six in each circle.

In the case where the rotating machine is used as a generator, generally, if the rotational speed is equal, when the number of poles is increased, the coil size decreases, and therefore the output voltage decreases. If the number of poles is decreased and thereby the coil size is increased, the number of windings is increased to increase the voltage. However, if the number of windings is increased too much, the wire resistance increases, and therefore the current decreases. Thus, the rotational speed and the number of coils, that is, the size of coil on each of the circuits have the optimum values. In the present invention, design can be made so that the optimum number of coils is provided on each of the circuits.

The stator has the plurality of coils as shown in FIG. 5, and is arranged in gaps fondled by the end rotors 3 and the inner rotor 5. The stator is isolated from the rotation of the rotating shaft, and is fixed to, for example, a containing case (housing). The stator is configured so that the coils are supported by a coil supporting member, and can preferably take a mode in which the coils are fitted in the coil supporting member formed into a frame shape. The coil supporting member is made of an insulating material such as a resin to prevent the occurrence of eddy current. Preferably, the stators are formed so that all of the stators have the same number of coils. The coil shape is approximately equal to the magnet shape. In single phase, preferably, the adjacent coils are wound in the reverse direction and connected in series. In triphase, preferably, three sets of coils arranged every third one in the circumferential direction that are connected in series are formed to provide a triphasic winding.

Further, the stators are laminated in two or more stages, and the coils at the same positions between the stators are connected in series, by which the generated voltage can be raised. Further, the numbers of the stages of the rotors and the stators can be increased as necessary to raise the voltage.

In the permanent magnet rotating machine of the present invention, the above-described disk-shaped rotors on which the permanent magnets are arranged are provided in at least three stages, and the stators having the stator coils are provided in the gaps at two or more locations formed by the rotors. That is to say, the rotors and the stators are laminated alternately in at least five stages in total with gaps being provided therebetween in the direction along the rotation axis. The upper limit of the number of stages is determined by the external dimensions permitted as a rotating machine and the thicknesses of the rotor and stator. When high output voltage is required, a shape in which the number of stages is increased as much as possible in the permitted external dimensions is desirable. By arranging a plurality of stages of rotors on which the plurality of magnets are arranged with the polarities of the magnets coinciding with each other in this manner, a magnet of one rotor at a position just facing to the N-pole magnet of another rotor forms the N pole. Therefore, the permeance of a magnetic circuit in the generator increases, and the magnetic fields generated in the gaps between the rotors are strengthened each other, so that a large magnetic flux can be taken out of the permanent magnet.

In the existing axial gap rotating machine of the present invention, if a space is present on the inner periphery side, the number of magnetic poles and coil circuits can further be increased. Therefore, in the case where the rotating machine is used as a generator, the capacity of generator can be increased without changing the external dimensions.

The coil group on each circuit can be controlled as a separate generator. By the above-described configuration, the same effect as that in the case where a plurality of generators are installed in the external dimensions of generator that are the same as those of the conventional generator can be achieved.

Figure 6:
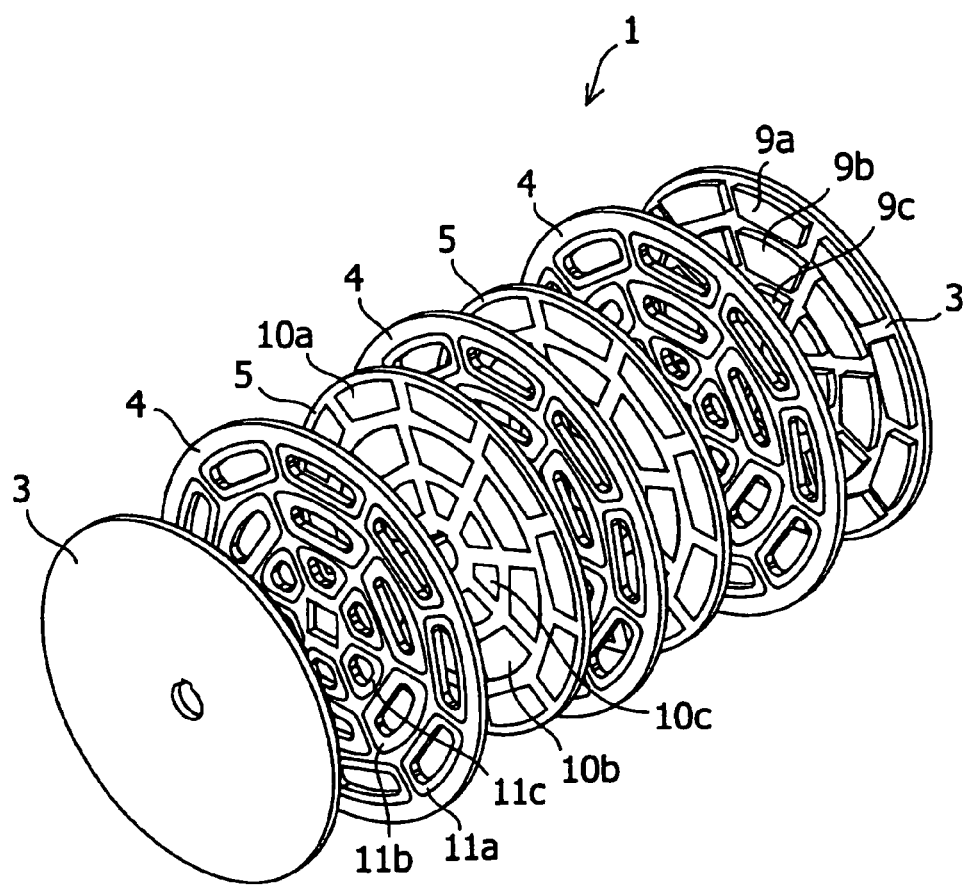
FIG. 6 is a perspective view showing another embodiment of a permanent magnet rotating machine of the present invention (showing an example in which the number of circles and stages is increased as compared with the example shown in FIG. 1)
Figure 7:
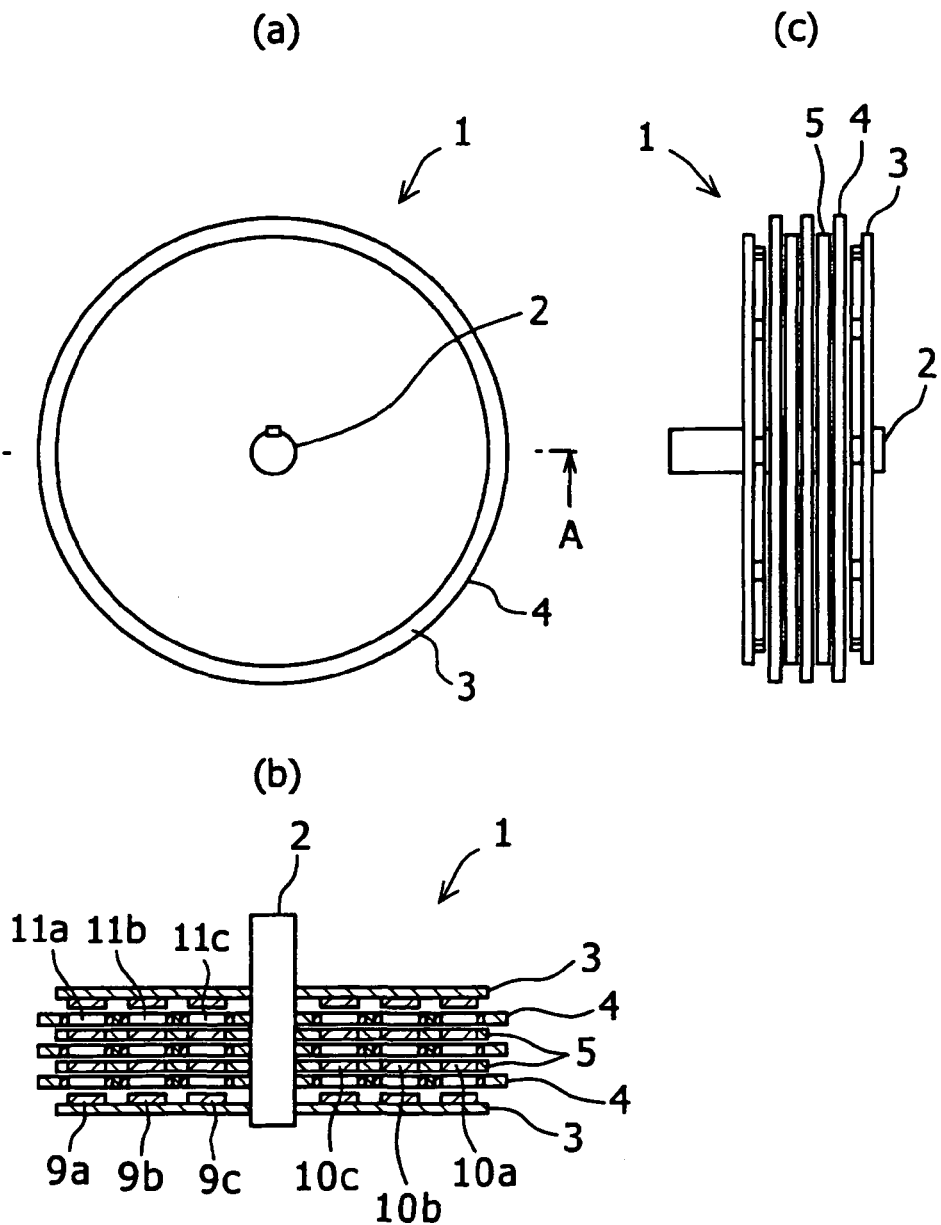
FIG. 7(A) is a front view of the rotating machine shown in FIG. 6, viewed in the direction along the rotation axis.
FIG. 7(B) is a side view thereof.
FIG. 7(C) is a sectional view thereof.

FIGS. 6 and 7 show an example in which the number of circles and stages is increased further. In this example, the four rotors 3 and 5 are provided in total, and the stators 4 are held between these rotors, so that a total of seven stages are formed. Further, the magnetic poles (9a, 9b, 9c, 10a, 10b, 10c) and the coils (11a, 11b, 11c) are formed in three concentric circles having different diameters. The rotor is formed so that the number of poles is ten, eight and eight from the outer periphery side, and the number of corresponding coils is nine, six, and six. In this example, to arrange the magnets without increasing the size thereof, the number of poles on the outer periphery side is increased.

Figure 8:
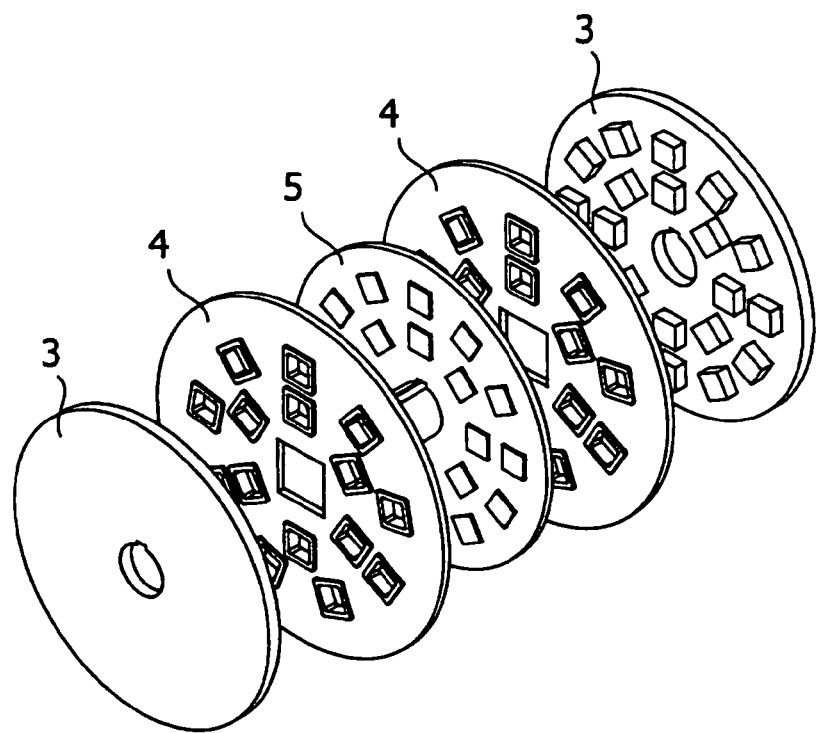
FIG. 8 is a perspective view showing still another embodiment of a permanent magnet rotating machine of the present invention (the number of magnetic poles and the number of coils differ between the inner periphery and the outer periphery)
Figure 9:
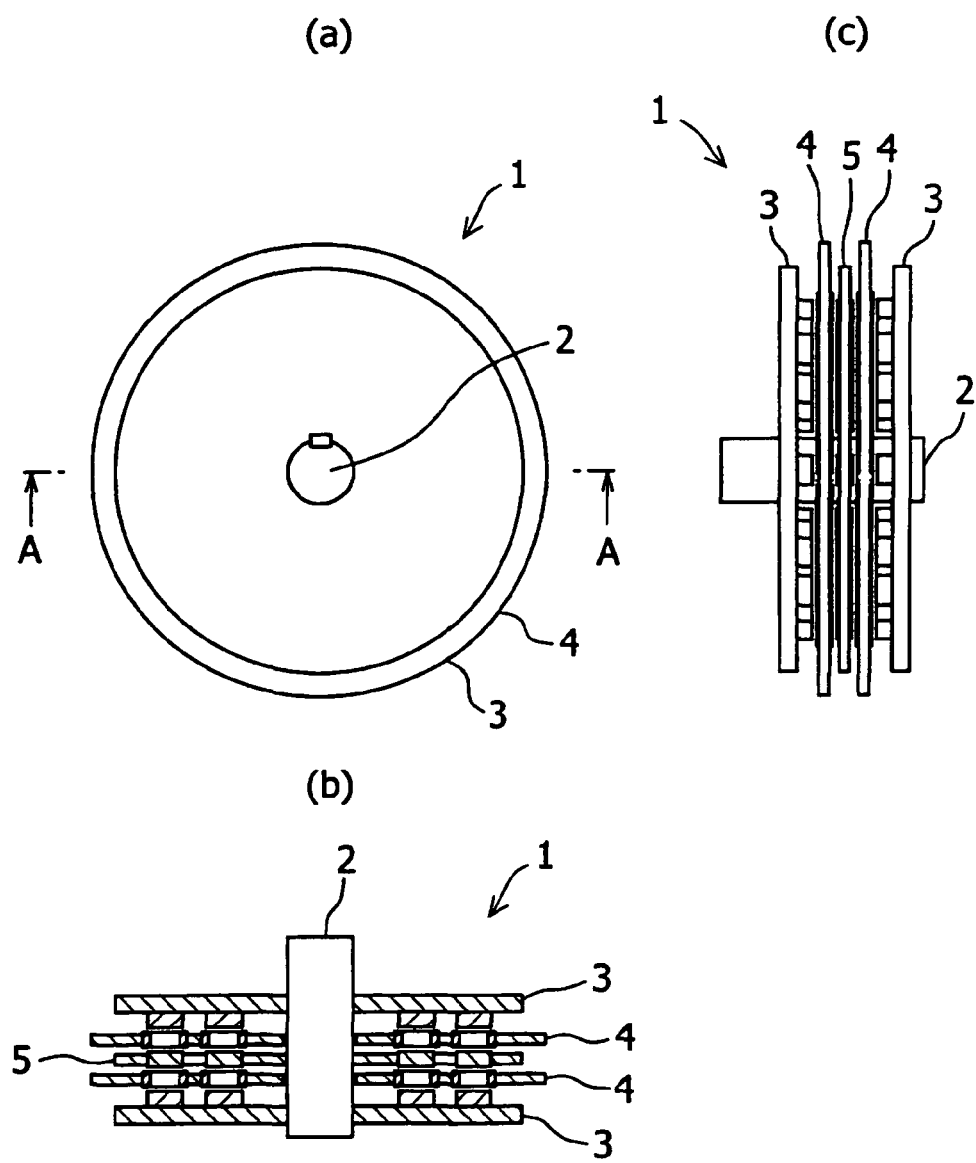
FIG. 9(A) is a front view of the rotating machine shown in FIG. 8, viewed in the direction along the rotation axis.
FIG. 9(B) is a side view thereof.
FIG. 9(C) is a sectional view thereof.

FIGS. 8 and 9 show another example of the present invention. In this example, the rotors are provided in three stages in total, and the stators are provided in two stages, so that a total of five stages are formed. The example shown in FIGS. 8 and 9 differs from the example shown in FIGS. 1 and 2 in that the number of coils and magnetic poles is different between the inner circuit and the outer circuit and that the shapes of coils and magnets are different. In FIGS. 8 and 9, the same magnetic poles and coils are arranged in two concentric circles having different diameters. The rotor is formed so that the number of poles is twelve and eight from the outer periphery side, and the number of corresponding coils is nine and six.

Figure 10:
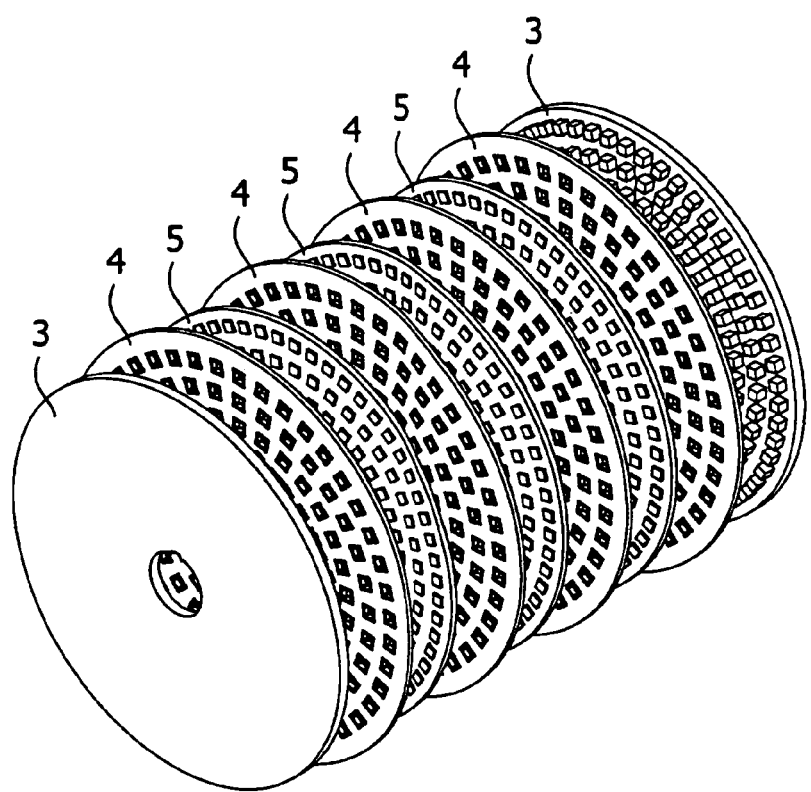
FIG. 10 is a perspective view showing yet another embodiment of a permanent magnet rotating machine of the present invention (showing an example in which the number of circles and stages is increased as compared with the examples shown in FIGS. 1 and 6)
Figure 11:
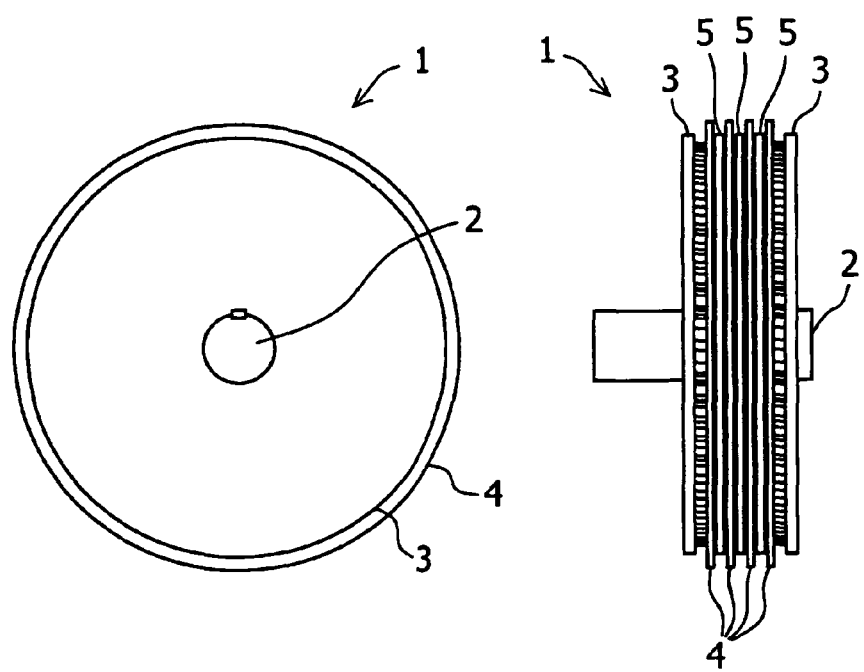
FIG. 11 exhibits a front view of the rotating machine shown in FIG. 10, viewed in the direction along the rotation axis, and a side view thereof.

FIGS. 10 and 11 show still another example in which the same magnets and coils are used as in FIGS. 8 and 9, and the scale is enlarged by increasing the number of circuits and stages. In this example, the rotors are provided in five stages, and the stators are held between these rotors, so that a total of nine stages are formed. Further, the magnetic poles and the coils are formed in six concentric circles having different diameters. The rotor is formed so that the number of poles is 56, 44, 40, 32, 24 and 16 from the outer periphery side, and the number of corresponding coils is 42, 33, 30, 24, 18 and 12. As described above, the present invention facilitates the scale-up of the permanent magnet rotating machine.

When the permanent magnet rotating machine of the present invention is used as a generator, once a rotational force is transmitted from a propeller to the rotating shaft, all of the rotors rotate synchronously with the rotating shaft, and the magnetic field formed in the gap between the rotors also rotates synchronously. As a result, the synchronously rotating magnetic field is given to the stators, and induced electromotive forces also synchronize between the stators. If the number of coils in each stator is made equal to the number of magnetic poles in each rotor, an electromotive force of single-phase alternating current is obtained, and if the number of coils in each stator is made 0.75 times the number of magnetic poles in each rotor, an electromotive force of triphasic alternating current is obtained. Further, the coils at the same position as viewed in the axial direction between the stators synchronously produce a voltage. Therefore, by connecting these coils in series, the electromotive force of the connected coils is proportional to the number of stages of the stators. Thus, by increasing the number of stator stages as necessary, a high power generation voltage can be obtained easily.

The electromotive force of alternating current obtained from the generator is changed to direct current via a rectifier, and therefore is stored in a battery or transmitted.

In the present invention, the magnetic poles and the coils are formed respectively in two or more concentric circles having different diameters. In the case where the rotating machine is used as a generator, the individual control of each circle achieves the same effect as that achieved by driving a plurality of generators by one shaft. Further, by arranging a plurality of the magnetic poles and coils as necessary, the capacity of generator can be increased. Also, since the coil used in the rotating machine of the present invention can be made as core-less, it is free from the increase in core loss due to the increase of magnetic poles.

Figure 12:
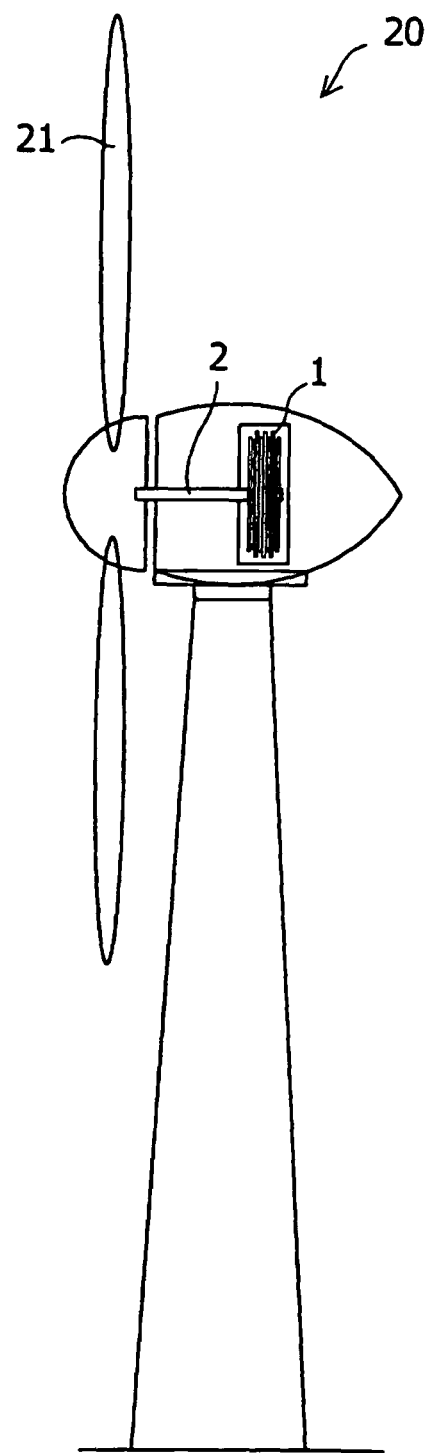
FIG. 12 is a schematic sectional view of a wind power generator incorporating a permanent magnet rotating machine of the present invention.
Figure 13:
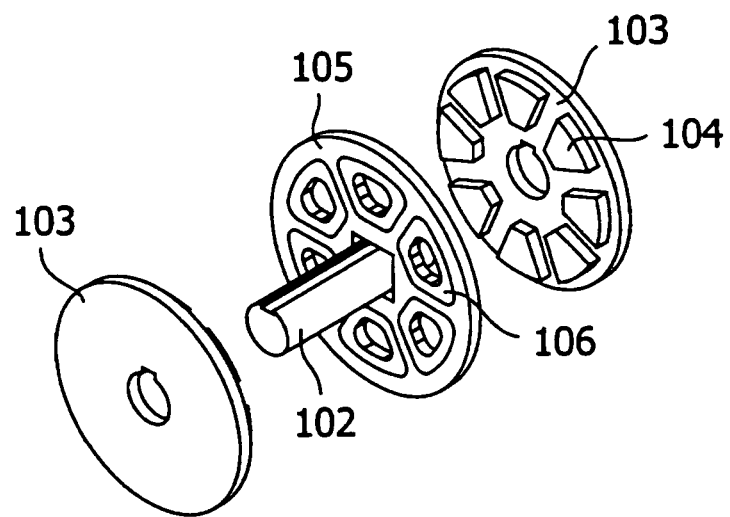
FIG. 13 is a perspective view showing one mode of a conventional rotating machine.
Figure 14:
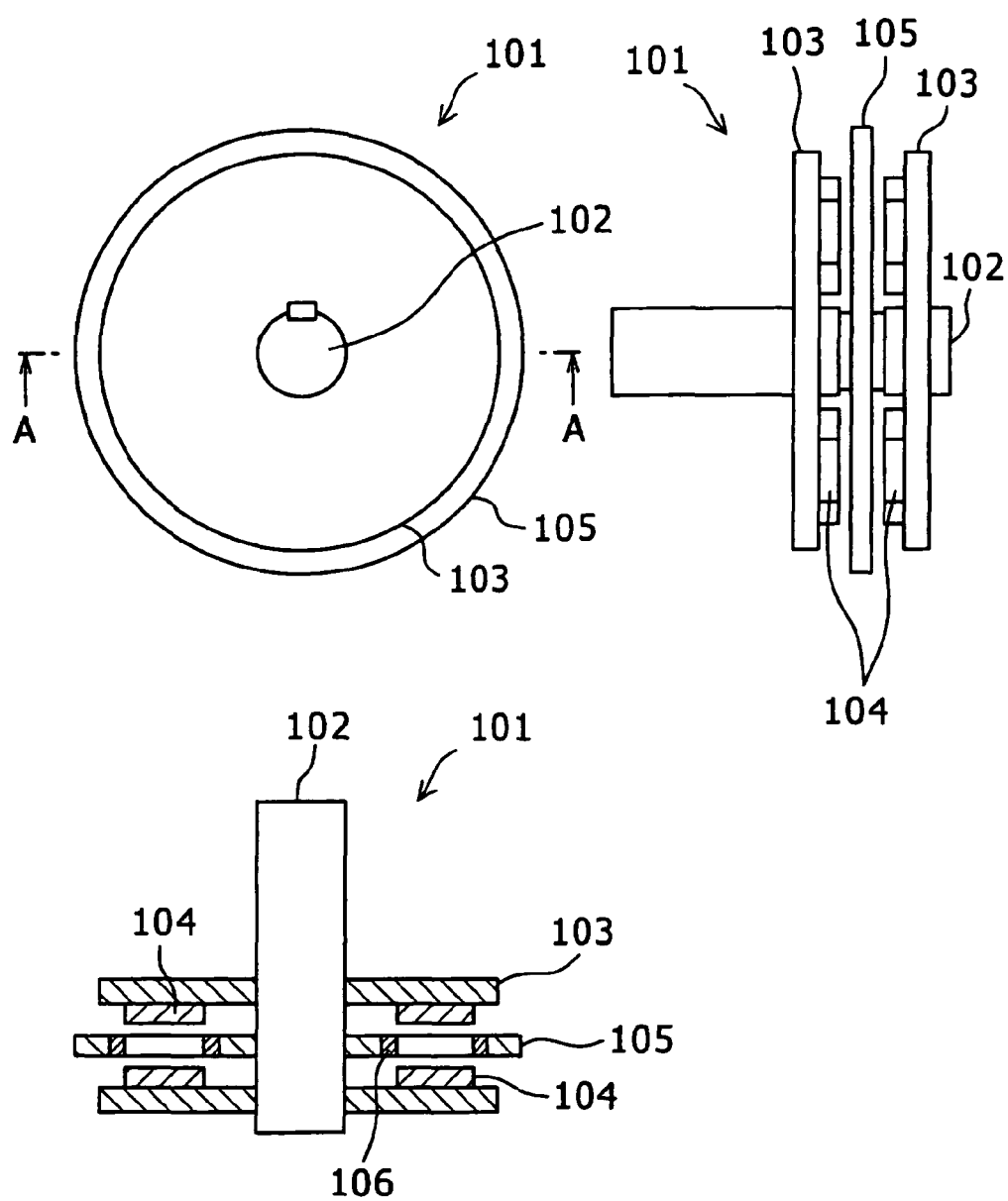
FIG. 14 exhibits a front view of the rotating machine shown in FIG. 13, viewed in the direction along the rotation axis, a side view thereof, and a sectional view thereof.
Figure 15:
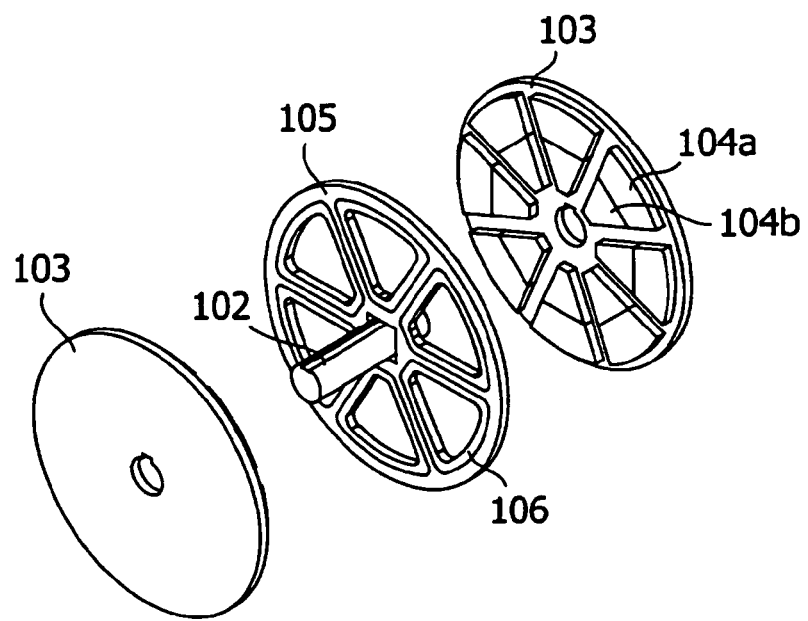
FIG. 15 is a perspective view showing another mode of a conventional rotating machine.
Figure 16:
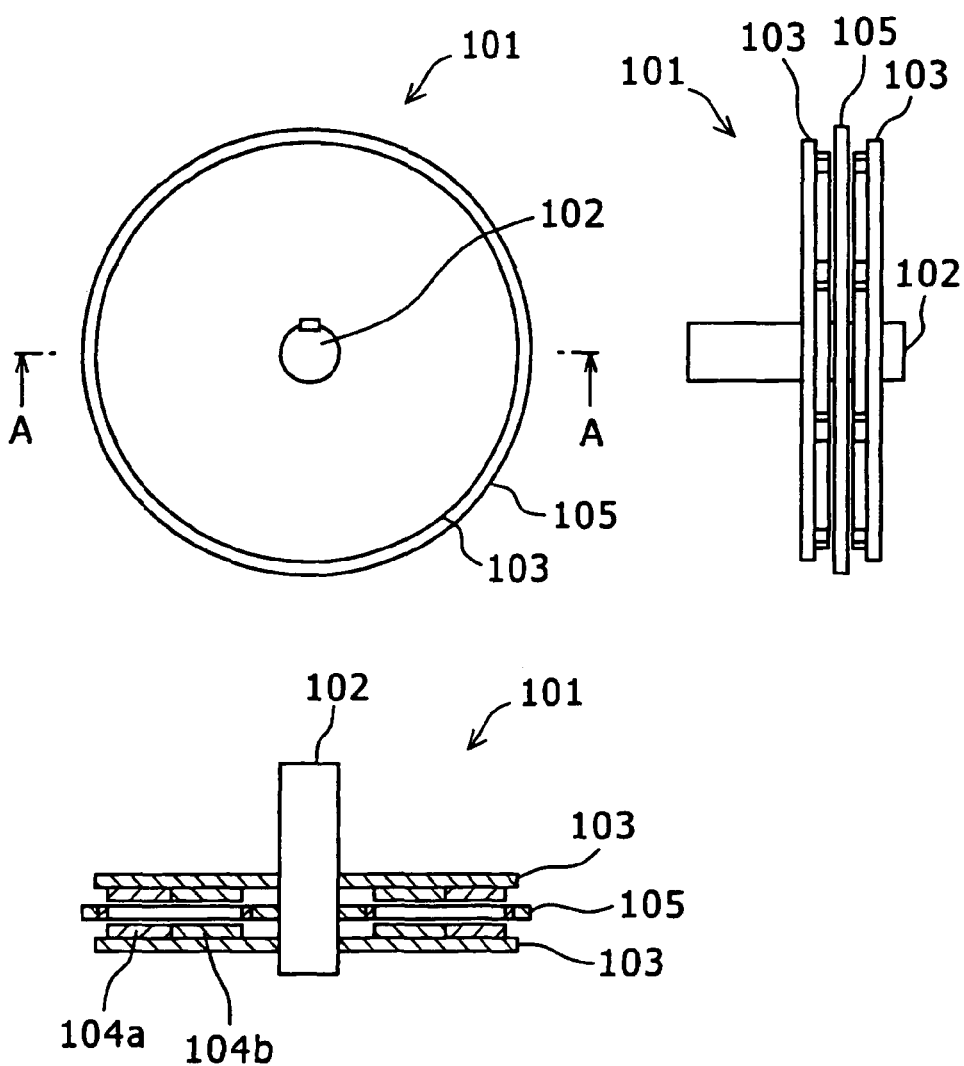
FIG. 16 exhibits a front view of the rotating machine shown in FIG. 15, viewed in the direction along the rotation axis, a side view thereof, and is a sectional view thereof.

A wind power generator comprising a propeller on the rotating shaft of the permanent magnet rotating machine of the present invention is also one of the present invention. When the rotating machine is used as a wind power generator 20 as shown in FIG. 12, it is desirable that a propeller 21 made of a reinforced plastic, which has been used generally, be used so as to be 360° turnable according to the wind direction. Also, when starting torque for the windmill is needed at the time of a gentle wind, the rotating machine of the present invention can be temporarily used as a motor.

The permanent magnet used for the present invention is not limited but includes preferably a high-performance rare-earth magnet containing a rare-earth element. A rare-earth sintered magnet formed of a so-called rare-earth intermetallic compound or a rare-earth bond magnet is preferably used. Further preferably, Nd-base anisotropic sintered magnet is used.

Because of its high energy product and large generated magnetic field, the rare-earth magnet is preferable for improving power generation performance, and the magnet cost thereof is low.

According to the above-described rotating machine constructed so as to have the multipolar magnet rotors each having the plurality of circuits and the stators of the present invention, the scale thereof can be enlarged by utilizing the shape of permanent magnet that is easy to manufacture.

Further, the rotating machine of the present invention can also be applied to a wing power generator or a hydraulic power generator.

Needless to say, the permanent magnet rotating machine of the present invention can be used dedicatedly as a motor in addition to the above-described use as a generator.

The invention claimed is:

1. A permanent magnet rotating machine for a wind power generator, comprising:

a rotating shaft;

two end rotors rotatably integrated with the rotating shaft, and being arranged with a space being provided therebetween in the axial direction of the rotating shaft, and comprising two end rotating disks and a plurality of end rotor permanent magnets arranged at the facing surfaces of the two end rotating disks;

at least one inner rotor rotatably integrated with the rotating shaft, and being arranged in the space formed by the two end rotors so as to be separated from the two end rotors, and comprising a rotating disk and a plurality of inner rotor permanent magnets supported by the inner rotating disk; and at least two stators isolated from the rotation of the rotating shaft, and being arranged in the spaces formed by the two end rotors and the inner rotor, and comprising at least two fixed disks, and a plurality of stator coils supported by the fixed disks, wherein the end and inner rotor permanent magnets, each having the magnetization direction in the axial direction of the rotating shaft, are arranged at equal intervals at each of the end and inner rotating disks, so as to have four or more magnetic poles arranged circumferentially in each of two or more concentric circles having different diameters; and three or more stator coils are arranged circumferentially at equal intervals in each of concentric circles of each of the fixed disks so as to face to the two or more concentric circles of the end and inner rotor permanent magnets, and the four or more magnetic poles and the three or more stator coils arranged circumferentially in each of the concentric circles are controlled individually as a different generator, with a change in wind velocity, wherein the permanent magnet rotating machine is a core less type.

2. The permanent magnet rotating machine according to claim 1, wherein the stator coils in each of the concentric circles are connected in series in a single phase state, or connected in a triphasic state.

3. The permanent magnet rotating machine according to claim 1, wherein the stator coils in each of the stators are aligned parallel to the rotating shaft and connected in series.

4. The permanent magnet rotating machine according to claim 1, wherein the end and inner rotor permanent magnets are rare-earth magnets.

5. The permanent magnet rotating machine according to claim 1, wherein the end and inner rotor permanent magnets are Nd-base rare-earth anisotropic sintered magnets.

6. The permanent magnet rotating machine according to claim 1, wherein the end rotor permanent magnets are stuck on the end rotating disks made of a ferromagnetic material.

7. The permanent magnet rotating machine according to claim 1, wherein each of the inner rotor magnets are fitted into a frame made of a nonmagnetic material.

8. The permanent magnet rotating machine according to claim 1, wherein the end and inner rotor magnets positioned parallel to the rotating shaft have the polarities coinciding with each other.

9. A wind power generator comprising a propeller on the rotating shaft of the permanent magnet rotating machine of claim 1.

* * * * *